United States Patent [19]

Kondo et al.

[11] Patent Number: 5,091,269
[45] Date of Patent: Feb. 25, 1992

[54] MAGNETIC RECORDING MEDIUM LUBRICANT CONSISTING OF AN AMINE SALT OF CARBOXYLIC ACID, AN AMINE SALT OF PERFLUOROALKYL CARBOXYLIC ACID OR AN FLUORO AMINE SALT OF PERFLUORO CARBOXYLIC ACID

[75] Inventors: Hirofumi Kondo, Kanagawa; Shuuichi Haga; Takaaki Matsuda, both of Miyagi, all of Japan

[73] Assignee: Sony Corporation, Tokyo, Japan

[21] Appl. No.: 450,665

[22] Filed: Dec. 14, 1989

[51] Int. Cl.$^5$ ............................................. G11B 5/00
[52] U.S. Cl. ................................. 428/695; 428/694; 428/900; 252/51.5 A; 252/62.54
[58] Field of Search ............. 428/694, 695, 900; 252/51.5 A, 62.54

[56] References Cited

U.S. PATENT DOCUMENTS

| | | | |
|---|---|---|---|
| 4,590,129 | 5/1986 | Kaschig et al. | 428/425.1 |
| 4,613,520 | 9/1986 | Dasgupta | 427/128 |
| 4,670,319 | 6/1987 | Katoh et al. | 428/141 |
| 4,708,906 | 11/1987 | Sekiya et al. | 428/336 |
| 4,755,337 | 7/1988 | Takahashi et al. | 264/134 |

FOREIGN PATENT DOCUMENTS

| | | |
|---|---|---|
| 56-62904 | 5/1981 | Japan . |
| 58-146028 | 8/1983 | Japan . |
| 59-127805 | 7/1984 | Japan . |
| 59-129937 | 7/1984 | Japan . |

Primary Examiner—Merrell C. Cashion, Jr.
Assistant Examiner—Stevan A. Resan
Attorney, Agent, or Firm—Hill, Van Santen, Steadman & Simpson

[57] ABSTRACT

A magnetic recording medium containing an amine salt of carboxylic acid as the lubricant is disclosed. The amine salt of carboxylic acid means a usual amine salt of carboxylic acid, synthesized from carboxylic acid and an organic amine, an amine salt of perfluoroalkyl carboxylic acid, synthesized from perfluoroalkyl carboxylic acid and an organic amine, and a fluoroamine salt of perfluoroalkyl carboxylic acid, synthesized from a perfluoroalkyl carboxylic acid and a fluorine substituted organic amine. The amine salt of carboxylic acid may be contained in the magnetic layer of the magnetic recording medium or top coated on the magnetic layer. Such amine salt of carboxylic acid exhibits superior solubility in general-purpose solvents and superior lubricating properties to diminish the coefficient of friction. Such lubricating properties are not impaired under hostile conditions, such as low temperature.

16 Claims, 4 Drawing Sheets

MAGNETIC RECORDING MEDIUM LUBRICANT CONSISTING OF AN AMINE SALT OF CARBOXYLIC ACID, AN AMINE SALT OF PERFLUOROALKYL CARBOXYLIC ACID OR AN FLUORO AMINE SALT OF PERFLUORO CARBOXYLIC ACID

BACKGROUND OF THE INVENTION

1. Field of the Invention

This invention relates to a magnetic recording medium, such as a magnetic tape or a magnetic disk. More particularly, it relates to a magnetic recording medium in which an amine salt of carboxylic acid is used as the lubricant.

2. Prior Art

With a so-called metal thin film type magnetic recording medium, in which a magnetic metal material is deposited, such as by evaporation, on a non-magnetic base so as to be used as a magnetic recording layer, or a so-called coated type magnetic recording medium, in which a magnetic paint containing extremely fine magnetic particles and the resin binder are coated on a non-magnetic base so as to be used as a magnetic layer, there are presented problems in that the effective contact area of the magnetic layer with sliding members such as the guide roller or the magnetic head is increased due to the high smoothness of the surface of the magnetic layer thus giving rise to increased coefficient of friction and so-called sticking as well as poor running properties and durability.

In order to obviate these problems, attempts have been made to use various lubricants, such as higher fatty acids or their esters, which are contained in or top coated on the magnetic layers of the magnetic recording medium to lower the coefficients of friction.

Meanwhile, the lubricants used with the magnetic recording medium are demanded, by their nature, to have special properties, which cannot be met with the lubricants in current use.

Thus the lubricants used with the magnetic recording medium are required i) to have excellent low temperature characteristics so as to exhibit lubricating effect to a certain extent when used in cold climate; ii) to be able to be coated to an extremely small thickness to meet the spacing requirements with respect to the magnetic head and to exhibit sufficient lubricating properties; and iii) to be able to be used for prolonged time or to have long service life with sustained lubricating properties.

However, higher fatty acids and esters thereof currently in use tends to become frozen and solidified at lower temperature, such as 0° C. or lower, unusuable as the lubricant or low in durability.

Thus the magnetic recording medium frequently exhibits poor runnability, abrasion resistance and durability due to inadequacy of the lubricant used with the recording medium.

OBJECT AND SUMMARY OF THE INVENTION

It is therefore an object of the present invention to provide a magnetic recording medium exhibiting superior lubricating properties under various operating conditions and sustained lubricating effects as well as excellent runnability, abrasion resistance and durability.

The present inventors have conducted eager researches towards accomplishment of the above object and found that the combination of carboxylic acid and the amine salt meets the above object. This finding has led to fulfilment of the present invention.

Thus the magnetic recording medium of the present invention is characterized in that it comprises at least a magnetic layer on a non-magnetic base and an amine salt of carboxylic acid.

Such amine salt of carboxylic acid may be synthesized from an ordinary carboxylic acid and an organic amine. It may also be an amine salt of perfluoroalkyl carboxylic acid, synthesized from perfluoroalkyl carboxylic acid, obtained upon substituting fluorine for hydrogen of a hydrocarbon group and an organic amine, or a fluoroamine salt of perfluoroalkyl carboxylic acid, synthesized from the above perfluoroalkyl carboxylic acid and an organic amine having a fluorinated alkyl chain.

Such amine salt of carboxylic acid, synthesized from carboxylic acid and an organic amine, exhibits high solubility in halogen-base organic solvents, such as freon, due to the presence of the hydrophobic amine salt having a long chain length. The hydrophobic amine salt having a long chain length contributes to the lowering of the surface energy and the coefficient of friction so that it exhibits satisfactory lubricating properties. Thus it displays high practical utility when employed as the lubricant for the magnetic recording medium.

Also the presence of two chains in each molecule constituting the amine salt contributes to improved intermolecular entanglement and intermolecular shearing stress and hence to improved durability.

These lubricating properties are not affected even under hostile operating conditions, such as low temperatures.

Thus the magnetic recording medium comprising the amine salt of carboxylic acid as the lubricant displays improved runnability and durability due to the aforementioned lubricating properties of the amine salt of carboxylic acid.

DETAILED DESCRIPTION OF THE INVENTION

Figure 1:
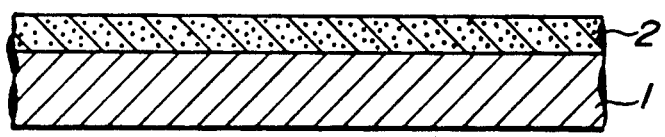
FIG. 1 is an enlarged cross-sectional view showing essential parts of an embodiment of a magnetic recording medium to which the present invention is applied.

An amine salt of carboxylic acid may be easily synthesized from carboxylic acid and amine in accordance with the following formulae:

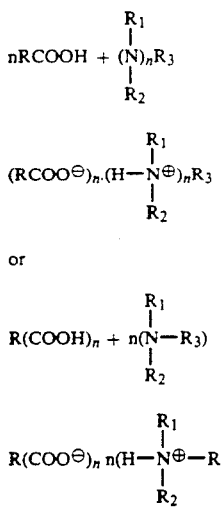

The numbers n for carboxylic acid and amine are preferably 1 to 3. With n not less than 4, a practical inconvenience is raised, such as lubricant handling, such that it becomes difficult to form a coating of an extremely small thickness.

In the above formulae, $R_1$, and $R_2$ stand for hydrogen or a hydrocarbon group and $R_3$ stands for a hydrocarbon group. Hydrocarbons may be alkyl, alkene or aryl or may take the form of cyclic compounds.

In the above formulae, R also stands for a hydrocarbon group which may be straight-chained or branched or may include double bonds or aromatic rings.

In any case, one of R, $R_1$, $R_2$ or $R_3$ is preferably a hydrocarbon group having not less than 10 carbon atoms. With the number of carbon atoms less than 10, lubricating effects fall short.

In the above formulae, R may also be a perfluoro alkyl group. In such case, the above amine salt of carboxylic acid is the amine salt of perfluoroalkyl carboxylic acid. The number of carbon atoms of the perfluoro alkyl group is preferably not less than 3. With the number of carbon atoms less than 3, lubricating effects derived from fluorine introduction cannot be expected. Although there is no upper limit to the number of carbon atoms, if the number is in excess of 12, difficulties are presented in handling the compound as the lubricant. The perfluoro alkyl group may be straight-chained or branched, as desired.

The above mentioned amine salt of perfluoroalkyl carboxylic acid is a novel compound which has not been introduced in literature. It can be synthesized easily from perfluoroalkyl carboxylic acid and an organic amine as the starting material and by i) reacting a preselected perfluoroalkyl carboxylic acid and an organic amine and recrystallizing the resulting reaction product in a solvent mixture of freon and petroleum ether, or by ii) dissolving a preselected perfluoroalkyl carboxylic acid and an organic amine in a chloroform solution, adding petroleum ether to the resulting solution, cooling and recrystallizing the resulting reaction product.

For synthesis of a commercially unavailable organic amine, a commercially available carboxylic acid, such as $C_{23}H_{47}COOH$, is heated with thionyl chloride ($SOCl_2$) to produce carboxylic acid chloride ($C_{23}H_{47}COCl$) which is then added gradually to ammoniac water at 5° C. or lower to produce carboxylic acid amide ($C_{23}H_{47}CONH_2$), which is then reduced with lithium aluminum hydroxide $LiAlH_4$ in anhydrous ether to produce an organic amine with a long chain length.

Fluorine may also be introduced into the organic amine. That is, at least one of the hydrocarbon groups $R_1$, $R_2$ and $R_3$ making up the amine may be a fluorinated alkyl group. In this case, the aforementioned amine salt of carboxylic acid is a fluoroamine salt of perfluorocarboxylic acid, and takes the form of a monofluoroalkylamine salt, a difuoralkylamine salt or trifluoroalkylamine salt, depending on the number of the fluorinated alkyl groups. With the monofluoroalkyl amine salt and difluoroalkyl amine salt, the groups other than the fluoroalkyl groups are hydrogen or common hydrocarbon groups, such as alkyl group.

The number of carbon atoms on the alkyl fluoride groups is also preferably 3 or more. With the number of carbon atoms less than 3, lubricating effect to be brought about by fluorine introduction cannot be expected. As for the upper limit of the number of carbon atoms, it is preferably not more than 12, because of the handling problems, as in the case of the aforementioned amine salt of perfluoroalkyl carboxylic acid. Meanwhile, the fluorinated alkyl group may be straight-chained or branched, while all or part of hydrogen atoms of the alkyl group may be substituted by fluorine.

The aforementioned amine salt of carboxylic acid is contained in the magnetic recording medium of the present invention.

As the magnetic recording medium to which the present invention is applied, mention may be made of a so-called coated type magnetic recording medium in which a magnetic coating film is formed as the magnetic layer by applying a magnetic paint on the surface of a non-magnetic base.

With the coated type magnetic recording medium any known types of the magnetic powders, resin binders constituting the magnetic coating film or the non-magnetic base may be employed without limitations.

Examples of the materials for non-magnetic base include high polymer material such as polyesters, polyolefins, cellulose derivatives, vinyl resins, polyimides, polyamides or polycarbonates, metals such as aluminum or titanium alloys or ceramics such as alumina glass or glass. There is no limitation to the shape of the base which may thus be in the form of a tape disk, sheet or drum. The non-magnetic base may also present fine irregularities on its surface by suitable surface treatment to control its surface characteristics.

Examples of the magnetic powders include magnetic iron oxide type particles, such as $\gamma$-$Fe_2O_3$ cobalt coated $\gamma$-$Fe_2O_3$ particles, magnetic chromium dioxide type particles, particles of magnetic metals, such as Fe, Co, Ni or their alloys, and powders of hexagonal system ferrite in the form of hexagonal plates.

Examples of the resin binder include polymers of vinyl chloride, vinyl acetate, vinyl alcohol, vinylidene chloride, acrylic acid ester, methacrylic acid ester, styrene, butadiene or acrylonitrile, copolymers of two or more of these monomers, polyurethane resin, polyester resin and epoxy resin. Hydrophilic polar groups, such as carboxylic acid, carboxylic acid or phosphoric acid groups, may also be introduced into these binders for improving dispersibility of the magnetic powders.

Additives such as dispersants, abrasives, anti-static agents or rust-proofing agents, in addition to the aforementioned resin powders and resin binders, may be added to the magnetic coating film.

Figure 2:
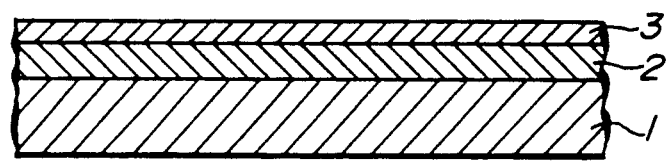
FIG. 2 is an enlarged cross-sectional view showing essential parts of a modified embodiment of a magnetic recording medium to which the present invention is applied.
Figure 3:
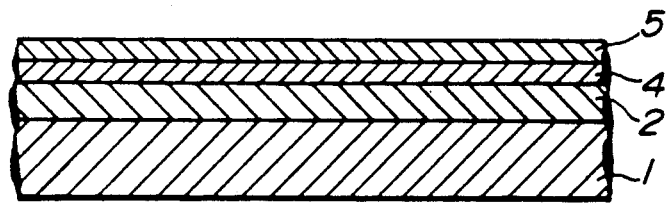
FIG. 3 is an enlarged cross-sectional view showing essential parts of another modified embodiment of a magnetic recording medium to which the present invention is applied.

The method for having the amine salt of carboxylic acid retained by the coated type magnetic recording medium include a method consisting in introducing the amine salt into a magnetic layer 2 formed as a magnetic coating film on a nonmagnetic base 1, as shown in FIG. 1, and in method consisting in top coating a lubricating layer 3 on the surface of the magnetic layer 2, as shown in FIG. 2.

When introducing the amine salt of carboxylic acid into the magnetic coating film, it is used in an amount of 0.2 to 20 parts by weight to 100 parts by weight of the resin binder.

When top coating the amine salt of carboxylic acid on the surface of the magnetic coating film, it is coated preferably in an amount of 0.5 to 100 mg/m$^2$ and more preferably in an amount of 1 to 20 mg/m$^2$.

The methods for top coating the amine salt of carboxylic acid include a method consisting in coating or spraying a solution of the amine salt of carboxylic acid in a suitable solution, and a method consisting in dipping the magnetic recording medium in the solution.

The present invention may also be applied to a so-called thin metal film type magnetic recording medium in which the magnetic thin film is formed as the magnetic layer such as by evaporation, on the surface of the non-magnetic base. The present invention may be applied to the thin metal film type magnetic recording medium in which an underlayer is provided between the non-magnetic base and the magnetic layer.

As the non-magnetic base or the magnetic metal thin film for the thin metal film type magnetic recording medium, any known types of the base or the magnetic metal thin film may be employed without limitations.

For example, the non-magnetic base of the same type as the aforementioned coated type magnetic recording medium may be employed. When using a base exhibiting rigidity, such as Al alloy plate or glass plate, as the non-magnetic base, an Ni-P film or an oxide film may be formed by alumite treatment on the base surface for surface hardening.

The magnetic metal thin films, which are formed as a continuous film by PVD technique, such as by plating, sputtering or vacuum evaporation, may include metal magnetic films for in-plane magnetization and recording, such as Fe, Co , Ni, Co-Ni base alloys, Co-Pt base alloys, Co-Ni-Pt base alloys, Fe-Co base alloys, Fe-Ni base alloys, Fe-Co-Ni base alloys, Fe-Ni-B base alloys, Fe-Co-B base alloys or Fe-Co-Ni-B base alloys, and metal magnetic thin films for perpendicular magnetization and recording, such as thin films of Co-Cr base alloys.

Above all, in the case of the metal magnetic thin films for in-plane magnetization and recording, an under layer of a low-melting non-magnetic material, such as Bi, Sb, Pb, Sn, Ga, In, Ge, Si or Ti, may be formed in advance on the nonmagnetic base, and the magnetic metal material may be deposited thereon, such as by evaporation or sputtering, from the perpendicular direction, so that the low melting nonmagnetic material is dispersed into the metal magnetic thin film to eliminate orientation properties while assuring inplane isotropy and improving coercivity.

For forming the aforementioned hard disk, hard protective films, such as carbon, diamond-like carbon, chromium oxide or SiO$_2$ films, may be formed on the surface of the metal magnetic thin film.

As the methods for having the amine salt of carboxylic acid retained by the metal thin film type, mention may be made of a method consisting in top coating a lubricating layer 3 on the surface of a metal magnetic thin film or of the protective film, as shown in FIG. 2. The amount of coating the amine salt of carboxylic acid is preferably 0.5 to 100 mg/m$^2$ and more preferably 1 to 20 mg/m$^2$.

The amine salt of carboxylic acid may be used as the lubricant for the magnetic recording medium either singly or in combination with known types of lubricants. Alternatively, it may be used in combination with a perfluoroalkyl carboxylic acid ester, a carboxylic acid perfluoroalkyl ester, a perfluoroalkyl carboxylic acid perfluoroalkyl ester, or derivatives thereof.

For coping with more stringent conditions and exhibiting sustained lubricating effects, an extreme pressure agent may be employed at a compositional weight ratio of 30:70 to 70:30.

An extreme pressure agent reacts with a metal surface by the heat of friction when the contact with metal is partially brought about in the region of boundary lubrication to produce a film of the reaction product to prevent the friction and abrasion from occurring. Any of the phosphorus-, sulphur-, halogen-, organometallic or complex type extreme pressure agents may be employed.

Rust-proofing agents may also be employed in addition to the lubricants and extreme pressure agents, if so desired.

Any of the rust-proofing agents commonly used with this type of the magnetic recording medium, such as phenols, naphthols, quinones, heterocyclic compounds containing nitrogen atoms, heterocyclic compounds containing oxygen atoms or heterocyclic compounds containing sulphur atoms.

Although the rust-proofing agent may be used in admixture with the lubricant containing an amine salt of carboxylic acid, a rust proofing layer 4 and a lubricant layer 5 may also be applied in two or more layers, with the layer 4 being formed on a magnetic layer 2 previously formed on a non-magnetic base 1 and with the lubricant layer 5 being subsequently applied to the rust-proofing layer 4.

In both the coated type and metal thin film type magnetic recording media, a back-coating layer or an underlayer may be formed, if so desired, besides the magnetic coating and the magnetic metal thin film.

For example, the back coating layer is formed by applying a mixture of the resin binder similar to that used in the magnetic coating film with a carbon fine powders for affording electrical conductivity or with an organic pigment for controlling the surface roughness.

According to the present invention, the aforementioned amine salt of carboxylic acid may be admixed or applied as a top coat to the back coating layer as the lubricant. Alternatively, the amine salt of carboxylic acid may be admixed or applied as a top coat to the magnetic coating layer, magnetic metal thin film and/or to the back coat layer as the lubricant.

The magnetic recording medium according to the present invention contains the amine salt of carboxylic acid exhibiting superior lubricating properties as the lubricant, so that lubricity may be maintained under any operating conditions for a prolonged time.

Thus the magnetic recording medium of the present invention is excellent in running properties, wear-resistance and durability.

The present invention will be explained with reference to Synthesis Examples, Examples and Comparative Examples. It is to be noted that the present invention is by no means limited to these Examples which are given only for the sake of illustration.

A synthesis example of an amine salt of carboxylic acid is given hereinbelow.

SYNTHESIS EXAMPLE 1

Equimolar amounts of a commercially available stearylamine, refined by recrystallization (melting point, 84° to 85° C.) were added to a commercially available stearic acid refined by recrystallization (melting point, 69° to 70° C.). The reaction system was dissolved in ethanol, reacted, condensed, cooled and filtered to a stearyl amine salt of stearic acid having the following structure:

$$C_{17}H_{35}COO^{\ominus}.H_3N^{\oplus}C_{18}H_{37}$$

On elementary analysis of the stearyl amine salt of stearic acid, the following results were obtained:
Found : C 78.32% ; H 13,075% ; N 2.40% .
Calcd. for $C_{36}H_{75}NO_2$: C 78.05% ; H 13.65% N 2.53%.

The structural formula for this amine salt may also be ascertained from these results.

In accordance with the above Synthesis Example, amine salts of carboxylic acid shown in Tables 1 and 2 were synthesized with different kinds of carboxylic acids and amines.

TABLE 1

| Structures |
|---|
| product 1  $C_{17}H_{35}\overset{-}{COO}.\overset{+}{H_3N}C_{18}H_{37}$ |
| product 2  $C_{17}H_{29}\overset{-}{COO}.\overset{+}{H_3N}C_{18}H_{37}$ |
| product 3  $C_{17}H_{29}\overset{-}{COO}.\overset{+}{H_3N}\text{—}\bigcirc$ |
| product 4  $C_{17}H_{35}\overset{-}{COO}.\overset{+}{H_3N}(CH_2)_4\overset{+}{NH_3}.\overset{-}{OOC}C_{17}H_{35}$ |
| product 5  $isoC_{17}H_{35}\overset{-}{COO}.\overset{+}{H_3N}(CH_2)_{10}\overset{+}{NH_3}.\overset{-}{OOC}isoC_{17}H_{35}$ |
| product 6  $C_{17}H_{35}\overset{-}{COO}.\overset{+}{H_2N}\diagup\overset{+}{NH_2}.\overset{-}{OOC}C_{17}H_{35}$ |
| product 7  $C_{17}H_{35}\overset{-}{COO}.\overset{+}{H_2N}\overset{CH_3}{\underset{C_{18}H_{37}}{\diagup}}$ |
| product 8  $C_{12}H_{25}\overset{-}{COO}.\overset{+}{H_3N}\text{—}\bigcirc\text{—}\overset{+}{NH_3}.\overset{-}{OOC}C_{12}H_{25}$ |

TABLE 2

| Structures |
|---|
| product 9  $C_{18}H_{37}\overset{+}{NH_3}.\overset{-}{OOC}\text{—}\bigcirc\text{—}\overset{-}{COO}.\overset{+}{H_3N}C_{18}H_{37}$ |
| product 10  $C_{18}H_{37}\overset{+}{NH_3}.\overset{-}{OOC}(CH_2)_4\overset{-}{COO}.\overset{+}{H_3N}C_{18}H_{37}$ |

TABLE 2-continued

| Structures |
|---|
| product 11  $C_{18}H_{31}\overset{+}{NH_3}.\overset{-}{OOC}\text{—}\bigcirc\text{—}\overset{-}{COO}.\overset{+}{H_3N}C_{18}H_{31}$ |
| product 12  $C_{18}H_{31}\overset{+}{NH_3}.\overset{-}{OOC}(CH_2)_{10}\overset{-}{COO}.\overset{+}{H_3N}C_{18}H_{3}$ |
| product 13  $isoC_{18}H_{37}\overset{+}{NH_3}.\overset{-}{OOC}\text{—}\bigcirc\text{—}\overset{-}{COO}.\overset{+}{H_3N}isoC_{18}H_{37}$ |
| product 14  $\bigcirc\text{—}\overset{+}{NH_3}.\overset{-}{OOC}\text{—}\bigcirc\text{—}\overset{-}{COO}.\overset{+}{H_3N}\text{—}\bigcirc$ |
| product 15  $\bigcirc\underset{H}{\overset{+}{NH_3}}.\overset{-}{OOC}\text{—}\bigcirc\text{—}\overset{-}{COO}.\underset{H}{\overset{+}{H_3N}}\text{—}\bigcirc$ |
| product 16  $C_{18}H_{31}\overset{+}{NH_3}.\overset{-}{OOC}\diagdown\overset{\overset{-}{COO}.\overset{+}{H_3N}C_{18}H_{31}}{\diagup}\overset{-}{COO}.\overset{+}{H_3N}C_{18}H_{31}$ |

The magnetic recording medium as shown below was produced using the products of synthesis shown in Tables 1 and 2.

The following Examples are those for the coated type magnetic recording medium.

EXAMPLE 1

With the following composition

| | |
|---|---|
| Co-coated γ-Fe₂O₃ | 100 pts. by wt. |
| vinyl chloride-vinyl acetate copolymer (VAGH produced by U.C.C.) | 10.5 pts. by wt. |
| polyurethane resin (M-5033 produced by Nippon Polyurethane Co. Ltd. | 10.5 pts. by wt. |
| carbon (antistatics) | 5 pts. by wt. |
| lecithin (dispersant) | 1 pt. by wt. |
| methylethylketone | 150 pts. by wt. |
| methylisobutylketone | 150 pts. by wt. | as the basic composition, 1.5 parts by weight of a synthesis product 1 in Table 1 were added to this basic composition to produce a mixture which was then mixed in a ball mill for 24 hours, taken out through a filter and admixed with 4 parts by weight of a curring agent. The resulting mixture was stirred for 30 minutes to a magnetic paint which was then coated on a 12 μm thick polyethylene terephthalate base to a dry thickness of 5 μm. The resulting product was dried after magnetiq field orientation, wound, calendered and out to half an inch width to produce sample tapes.

EXAMPLES 2 to 16

Sample tapes were produced in the same way as in Example 1 except that synthesis products 2 to 16 were used in lieu of synthesis product 1.

COMPARATIVE EXAMPLE 1

Sample tapes were produced in the same way as in Example 1 except that no lubricant was used in lieu of synthesis product 1.

The coefficients of friction and the stick slip of the sample tapes produced as above were measured both before and after aging under the conditions of the temperature of 25° C. and the relative humidity of 60% and under the conditions of the temperature of 40° C. and the relative humidity of 80%. The results are shown in Tables 3 and 4.

TABLE 3

| | Conditions | pre-aging coefficient of friction | pre-aging stick slip | post-aging coefficient of friction | post-aging stick slip |
|---|---|---|---|---|---|
| Example 1 | 25° C., 60% RH | 0.24 | ○ | 0.25 | ○ |
| | 40° C., 80% RH | 0.26 | ○ | 0.27 | ○ |
| Example 2 | 25° C., 60% RH | 0.28 | ○ | 0.29 | ○ |
| | 40° C., 80% RH | 0.28 | ○ | 0.30 | ○ |
| Example 3 | 25° C., 60% RH | 0.29 | ○ | 0.30 | ○ |
| | 40° C., 80% RH | 0.30 | ○ | 0.31 | ○ |
| Example 4 | 25° C., 60% RH | 0.26 | ○ | 0.27 | ○ |
| | 40° C., 80% RH | 0.28 | ○ | 0.28 | ○ |
| Example 5 | 25° C., 60% RH | 0.27 | ○ | 0.29 | ○ |
| | 40° C., 80% RH | 0.28 | ○ | 0.29 | ○ |
| Example 6 | 25° C., 60% RH | 0.29 | ○ | 0.29 | ○ |
| | 40° C., 80% RH | 0.30 | ○ | 0.31 | ○ |
| Example 7 | 25° C., 60% RH | 0.28 | ○ | 0.30 | ○ |
| | 40° C., 80% RH | 0.27 | ○ | 0.28 | ○ |
| Example 8 | 25° C., 60% RH | 0.26 | ○ | 0.29 | ○ |
| | 40° C., 80% RH | 0.28 | ○ | 0.28 | ○ |
| Example 9 | 25° C., 60% RH | 0.30 | ○ | 0.31 | ○ |
| | 40° C., 80% RH | 0.31 | ○ | 0.31 | ○ |

TABLE 4

| | Conditions | pre-aging coefficient of friction | pre-aging stick slip | post-aging coefficient of friction | post-aging stick slip |
|---|---|---|---|---|---|
| Example 10 | 25° C., 60% RH | 0.28 | ○ | 0.29 | ○ |
| | 40° C., 80% RH | 0.31 | ○ | 0.32 | ○ |
| Example 11 | 25° C., 60% RH | 0.29 | ○ | 0.31 | ○ |
| | 40° C., 80% RH | 0.30 | ○ | 0.33 | ○ |
| Example 12 | 25° C., 60% RH | 0.26 | ○ | 0.29 | ○ |
| | 40° C., 80% RH | 0.28 | ○ | 0.33 | ○ |
| Example 13 | 25° C., 60% RH | 0.30 | ○ | 0.35 | ○ |
| | 40° C., 80% RH | 0.31 | ○ | 0.35 | ○ |
| Example 14 | 25° C., 60% RH | 0.28 | ○ | 0.29 | ○ |
| | 40° C., 80% RH | 0.28 | ○ | 0.30 | ○ |
| Example 15 | 25° C., 60% RH | 0.26 | ○ | 0.30 | ○ |
| | 40° C., 80% RH | 0.27 | ○ | 0.29 | ○ |
| Example 16 | 25° C., 60% RH | 0.31 | ○ | 0.34 | ○ |
| | 40° C., 80% RH | 0.32 | ○ | 0.36 | ○ |
| Comparative Example 1 | 25° C., 60% RH | — | X | — | X |
| | 40° C., 80% RH | — | X | — | X |

It is seen from Table 3 and 4 that, by using the amine salt of carboxylic acid as the lubricant, very good results could be obtained with the coefficients of friction or stick clip not undergoing deterioration under various conditions.

Examples for a metal thin film type magnetic recording medium, that is a hard disk provided with an underlayer, are given hereinbelow.

EXAMPLE 17

As a non-magnetic metal under layer, an Al-Mg alloy substrate (thickness, 15 nm ; outside diameter, 95 nm ; inside diameter, 25 nm ) on which an Ni-P plating layer was formed to a thickness of 15 μm was produced. On this plating layer was formed a low melting metal underlayer, having a film thickness of 200 Å, by depositing bismuth (Bi) by electron beam evaporation under the pressure of $1 \times 10^{-5}$ Torr and the substrate temperature of 150° C.

On this underlayer was formed a metal magnetic thin film (film thickness, 1000 Å) by depositing cobalt (Co) by electron beam evaporation under the pressure of $1 \times 10^{-5}$ Torr and the substrate temperature of 150° C. On the thus produced metal magnetic thin film was further formed a carbon protective film by vacuum evaporation.

Finally, the lubricant shown in Table 1 as product 1 was applied on the carbon protective film to produce a sample disk.

EXAMPLES 18-32

Sample disks were produced in the same way as in Example 17 except using the products 2 to 16, in place of the product 1, as the lubricant.

For each of the sample disks, coefficients of friction after 20,000 times of the contact start stop (CSS) test. The results are shown in Tables 5 and 6.

TABLE 5

| | lubricant | coefficient of friction |
|---|---|---|
| Example 17 | product 1 | 0.35 |
| Example 18 | product 2 | 0.40 |
| Example 19 | product 3 | 0.29 |
| Example 20 | product 4 | 0.40 |
| Example 21 | product 5 | 0.35 |
| Example 22 | product 6 | 0.28 |
| Example 23 | product 7 | 0.32 |

TABLE 6

| | lubricant | coefficient of friction |
|---|---|---|
| Example 24 | product 8 | 0.35 |
| Example 25 | product 9 | 0.35 |
| Example 26 | product 10 | 0.39 |
| Example 27 | product 11 | 0.36 |
| Example 28 | product 12 | 0.44 |
| Example 29 | product 13 | 0.41 |
| Example 30 | product 14 | 0.29 |
| Example 31 | product 15 | 0.45 |
| Example 32 | product 16 | 0.37 |

It is seen from the above Table 5 and 6 that the sample disk in which a carbon protective layer is formed on the surface of the metal magnetic thin film and the product shown in Table 1 as the lubricant is applied thereto exhibits superior CSS characteristics and improved durability.

Examples for metal thin film type magnetic recording medium (tape obtained by evaporation) follow.

EXAMPLE 33

A magnetic metal thin film having a film thickness of 1,000 Å was produced by applying cobalt (Co) on a polyethylene terephthalate film 14 μm thick by oblique evaporation.

On the surface of this magnetic metal thin film was applied the product 1 of Table 1 dissolved in a solvent mixture of fleon and ethanol at a coating rate of 5 mg/m² and the thus produced film was cut to 8 mm width to produce sample tapes.

EXAMPLES 34 to 48

Sample tapes were produced in the same way as in Example 33 except using the products 2 to 16 in lieu of the product 1 of Table 1 used as the lubricant in Example 33.

The coefficients of friction, still durability and shuttle durability of the above sample tapes were measured at the temperature of 25° C. and relative humidity of 60%, at the temperature of −5° C. and at the temperature of 40° C. and relative humidity of 30%. Still durability was measured by the time elapsed until the output is decreased to −3 dB in the paused state. Shuttle durability was measured by the number of times of shuttling until the output was lowered by 3 dB on the occasion of shuttle running continuing for 2 minutes each time. Similar measurement was made as Comparative Example 2 of a blank tape produced without using the lubricant. The results are shown in Tables 7, 8 and 9.

TABLE 7

| Example | conditions | coefficient of friction | still durability (minutes) | shuttle durability (number of times) |
|---|---|---|---|---|
| Example 33 | 25° C., 60% RH | 0.25 | >60 | >150 |
| | −5° C. | 0.26 | 59 | >150 |
| | 40° C., 30% RH | 0.28 | >60 | >150 |
| Example 34 | 25° C., 60% RH | 0.24 | >60 | >150 |
| | −5° C. | 0.25 | 59 | >150 |
| | 40° C., 30% RH | 0.25 | >57 | >150 |
| Example 35 | 25° C., 60% RH | 0.23 | >60 | >150 |
| | −5° C. | 0.25 | >60 | >150 |
| | 40° C., 30% RH | 0.24 | >60 | >150 |
| Example 36 | 25° C., 60% RH | 0.25 | >60 | >150 |
| | −5° C. | 0.25 | 49 | >150 |
| | 40° C., 30% RH | 0.29 | 55 | >150 |

TABLE 8

| | conditions | coefficient of friction | still durability (minutes) | shuttle durability (number of times) |
|---|---|---|---|---|
| Example 37 | 25° C., 60% RH | 0.30 | >60 | >150 |
| | −5° C. | 0.29 | 55 | >150 |
| | 40° C., 30% RH | 0.31 | 52 | >150 |
| Example 38 | 25° C., 60% RH | 0.27 | >60 | >150 |
| | −5° C. | 0.28 | 54 | >150 |
| | 40° C., 30% RH | 0.26 | 59 | >150 |
| Example 39 | 25° C., 60% RH | 0.30 | >60 | >150 |
| | −5° C. | 0.29 | 55 | >150 |
| | 40° C., 30% RH | 0.32 | 59 | >150 |
| Example 40 | 25° C., 60% RH | 0.24 | >60 | >150 |
| | −5° C. | 0.25 | 54 | >150 |
| | 40° C., 30% RH | 0.27 | 58 | >150 |
| Example 41 | 25° C., 60% RH | 0.26 | >60 | >150 |
| | −5° C. | 0.27 | 58 | >150 |
| | 40° C., 30% RH | 0.28 | 56 | >150 |
| Example 42 | 25° C., 60% RH | 0.25 | >60 | >150 |
| | −5° C. | 0.24 | >60 | >150 |
| | 40° C., 30% RH | 0.26 | 57 | >150 |
| Example 43 | 25° C., 60% RH | 0.25 | >60 | >150 |
| | −5° C. | 0.29 | 55 | >150 |
| | 40° C., 30% RH | 0.30 | >60 | >150 |
| Example 44 | 25° C., 60% RH | 0.25 | >60 | >150 |
| | −5° C. | 0.24 | 54 | >150 |
| | 40° C., 30% RH | 0.26 | 58 | >150 |

TABLE 9

| | conditions | coefficient of friction | still durability (minutes) | shuttle durability (number of times) |
|---|---|---|---|---|
| Example 45 | 25° C., 60% RH | 0.25 | >60 | >150 |
| | −5° C. | 0.28 | 58 | >150 |
| | 40° C., 30% RH | 0.29 | 55 | >150 |
| Example 46 | 25° C., 60% RH | 0.25 | >60 | >150 |
| | −5° C. | 0.25 | 56 | >150 |
| | 40° C., 30% RH | 0.29 | 54 | >150 |
| Example 47 | 25° C., 60% RH | 0.23 | >60 | >150 |
| | −5° C. | 0.25 | >60 | >150 |
| | 40° C., 30% RH | 0.28 | 59 | >150 |
| Example 48 | 25° C., 60% RH | 0.24 | >60 | >150 |
| | −5° C. | 0.29 | 58 | >150 |
| | 40° C., 30% RH | 0.30 | >60 | >150 |

TABLE 9-continued

| | conditions | coefficient of friction | still durability (minutes) | shuttle durability (number of times) |
|---|---|---|---|---|
| Comparative Example 2 | 25° C., 60% RH | 0.9 | 2 | 3 |
| | −5° C. | — | — | — |
| | 40° C., 30% RH | — | — | — |

It is seen from Tables 7, 8 and 9 that, by using the amine salt of carboxylic acid as the lubricant, very good results could be obtained without deterioration in the coefficients of friction, still durability and shuttle durability under various conditions.

A synthesis example of an amine salt of perfluoroalkyl carboxylic acid is given below.

SYNTHESIS EXAMPLE 2

Equimolar amounts of commercially available nonadecafluoro carboxylic acid and stearyl amine were mixed together and stirred at 100° C. for 20 minutes. After cooling, the reaction product was recrystallized in a solvent mixture of fleon and petroleum ether. A stearylamine salt of nonadecafluoro carboxylic acid melting at 69° to 70° C. was produced at a yield of 95%.

Mass spectrum and IR absorption spectrum of this compound are shown in FIGS. 4A, 4B, 5 and 6.

Figure 4A:
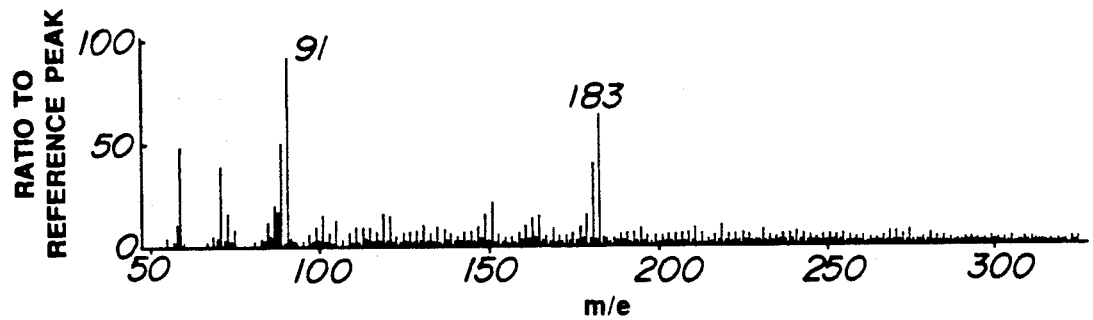
FIGS. 4A and 4B show a spectrum of mass spectrometry by FAB-MS (negative) of a typical amine salt of perfluoroalkyl carboxylic acid.
Figure 4B:
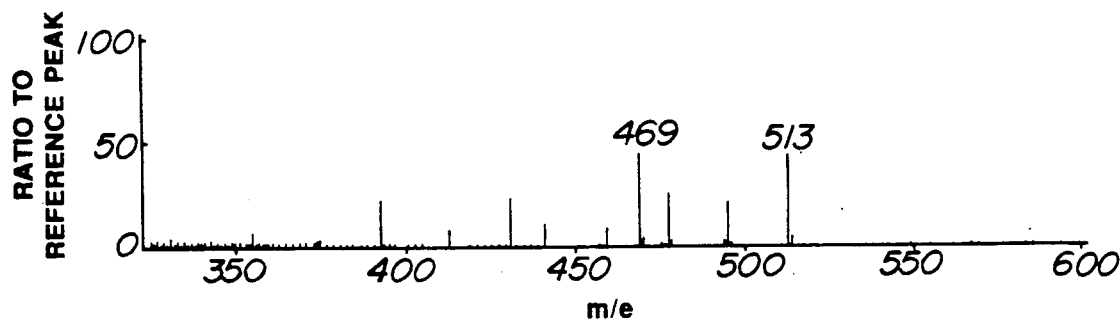
Figure 5:
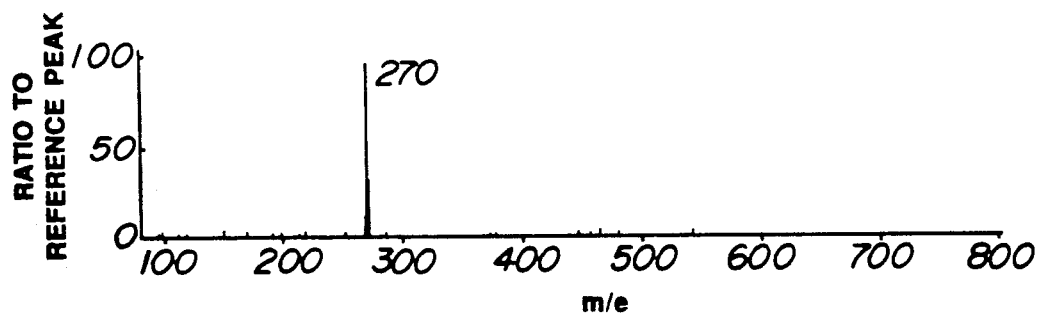
FIG. 5 shows a spectrum of mass spectrometry by FAB-MS (positive) similar to FIGS. 4A and 4B.

In the mass spectrum shown in FIGS. 4A and 4B, which is the spectrum by FAB-MS (negative method), a peak exists at m/e 513 due to $C_9F_{19}COO^-$, while another peak exists at m/e 469 due to $(M-CO_2)$. In the mass spectrum shown in FIG. 5, which is the spectrum by FAB-MS (positive method), a peak exists at m/e 270 due to $C_{18}H_{37}N^+H_3$.

Although the molecular ion peak could not be detected, the structure of the cation and anion could be ascertained from the above facts.

Figure 6:
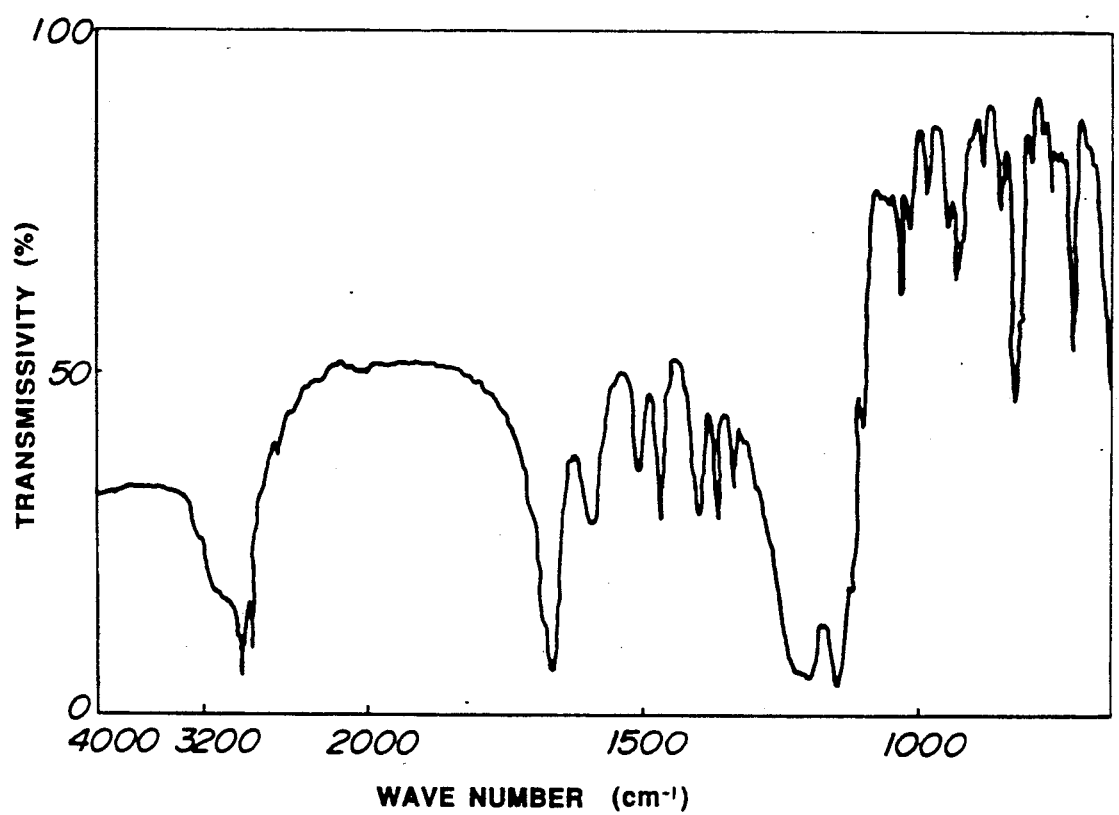
FIG. 6 shows an IR absorption spectrum thereof.

In the IR absorption spectrum shown in FIG. 6, broad absorption ascribable to the stretching vibration of an amine salt($H_3N^+-$) may be observed at 3300 to 2800 cm$^{-1}$, from which it is seen that the stearyl amine of the starting material has been turned into a salt. The structure of this amine salt is supported by the fact that stretching vibration due to C—H is observed at 2930 cm$^{-1}$ and 2850 cm$^{-1}$ and that the stretching vibration of perfluoroalkyl carboxylic acid is shifted to 1670 cm$^{-1}$.

The reaction product produced by the above synthesis was a stearyl amine salt of nonadecafluoro carboxylic acid having the structure of $C_9F_{19}COO^\ominus \cdot H_3N^\oplus C_{18}H_{37}$.

In accordance with the above synthesis example, amine salts of perfluoroalkyl carboxylic acid shown in Table 10 were produced, using various different kinds of prefluoro carboxylic acids and organic amines.

TABLE 10

| | Structures |
|---|---|
| product 17 | $C_9F_{19}COO^\ominus H_3 \overset{\oplus}{N} C_{18}H_{37}$ |
| product 18 | $C_9F_{19}COO^\ominus H_3 \overset{\oplus}{N} C_{24}H_{49}$ |
| product 19 | $C_7F_{15}COO^\ominus H_3 \overset{\oplus}{N}(CH_2)_{12} \overset{\oplus}{N} H_3 OOC C_7F_{15}^\ominus$ |
| product 20 | $C_9F_{19}COO^\ominus H_3 \overset{\oplus}{N}(CH_2)_{12} \overset{\oplus}{N} H_3 OOC C_9F_{19}^\ominus$ |
| product 21 | $C_9F_{19}COO^\ominus H_3 \overset{\oplus}{N}(CH_2)_4 \overset{\oplus}{N} H_3 OOC C_9F_{19}^\ominus$ |

TABLE 10-continued

| | Structures |
|---|---|
| product 22 | $C_9F_{19}COO^{\ominus}H_3\overset{\oplus}{N}C_{18}H_{37}$ <br>                                                 \| <br>                                                 $CH_3$ |
| product 23 | $C_9F_{19}COO^{\ominus}H\overset{\oplus}{N}(C_2H_5)_3$ |
| product 24 | $C_9F_{19}COO^{\ominus}H_3\overset{\oplus}{N}\text{—}\langle\text{C}_6\text{H}_4\rangle\text{—}\overset{\oplus}{N}H_3OOCC_9F_{19}$ |
| product 25 | $C_7F_{15}COO^{\ominus}H_3\overset{\oplus}{N}C_{18}H_{35}$ |
| product 26 | $C_7F_{15}COO^{\ominus}H_3\overset{\oplus}{N}C_{18}H_{31}$ |
| product 27 | $C_9F_{19}COO^{\ominus}H_2\overset{\oplus}{N}\text{(morpholine ring)}$ |
| product 28 | $C_9F_{19}COO^{\ominus}H_3\overset{\oplus}{N}\text{—}\langle\text{C}_6\text{H}_{11}\rangle$ |
| product 29 | $C_7F_{15}COO^{\ominus}H_3\overset{\oplus}{N}\text{—}\langle\text{C}_6\text{H}_4\rangle\text{—}\overset{\oplus}{N}H_3OOCC_7F_{15}$ |
| product 30 | $C_7F_{15}COO^{\ominus}H_3\overset{\oplus}{N}C_{18}H_{37}$ |

First of all, solubility of the lubricant of the present invention in an organic solvent was checked.

PRELIMINARY EXAMPLE

Solubility of the products 17, 18 and 19 and an ammonium salt of nonadecafluoro carboxylic acid shown by $C_9F_{19}COO^{\ominus}{}^{NH_4\oplus}$ of Table 10 in organic solvents fleon, chloroform, 1,1,1-trichloroethane and ethyl alcohol was checked. The results are shown in Table 11.

TABLE 11

| lubricant | fleon | chloroform | 1,1,1-trichloroethane | ethanol |
|---|---|---|---|---|
| product 17 | easily soluble | soluble | soluble | easily soluble |
| product 18 | easily soluble | soluble | soluble | easily soluble |
| product 19 | soluble | soluble | soluble | easily soluble |
| ammonium salt of nonadeca fluoro-carboxylic acid | difficulty soluble | difficulty soluble | difficulty soluble | easily soluble |

It is seen from Table 11 that, when compared with an ammonium salt of perfluoroalkyl carboxylic acid, a long chain amine salt of perfluoroalkyl carboxylic acid has a molecular structure containing a high proportion of hydrophobic constituents. The long chain amine salt of perfluoroalkyl carboxylic acid exhibits superior solubility in halogen base organic solvents, such as fleon, exhibiting no explosion-proofness, thus enabling the productivity to be improved.

Then, using the products shown in Table 10, the undermentioned magnetic recording medium was produced.

The following Example is directed to a coated type magnetic recording medium.

EXAMPLE 49

With the following composition

| | |
|---|---|
| Co-coated $\gamma$-$Fe_2O_3$ | 100 pts. by wt. |
| vinyl chloride-vinyl acetate copolymer (VAGH produced by U.C.C.) | 10.5 pts. by wt. |
| polyurethane resin (M-5033 produced by Nippon Polyurethane Co. Ltd.) | 10.5 pts. by wt. |
| carbon (antistatics) | 5 pts. by wt. |
| lecithin (dispersant) | 1 pt. by wt. |
| methylethylketone | 150 pts. by wt. |
| methylisobutylketone | 150 pts. by wt. | as the basic composition, 1.5 parts by weight of the synthesis product 17 in Table 10 were added to this basic composition to produce a mixture which was then mixed in a ball mill for 24 hours, taken out through a filter and admixed with 4 parts by weight of a curring agent. The resulting mixture was stirred for 30 minutes to a magnetic paint which was then coated on a 12 μm thick polyethyleneterephthalate base to a dry thickness of 5 μm. The resulting product was dried after magnetic field orientation, wound, calendered and cut to one half inch width to produce sample tapes.

EXAMPLES 50 TO 62

Sample tapes were prepared in the same way as in Example 49 except using the products 18 to 30 of Table 10 in lieu of the product 17 in Example 49.

COMPARATIVE EXAMPLE 3

Sample tapes were produced in the same way as in Example 49 except that no lubricant was used to replace the product 17 in Example 49.

COMPARATIVE EXAMPLE 4

Sample tapes were produced in the same way as in Example 49 except that an ammonium salt of nonadecafluorocarboxylic acid was used in place of the product 17 in Example 49.

The coefficients of friction and stick slip were measured of the above sample tapes before and after aging at the temperature of 25° C. and the relative humidity of 60% and at the temperature of 40° C. and the relative humidity of 80%. The results are shown in Tables 12 and 13.

TABLE 12

| | | pre-aging | | post-aging | |
|---|---|---|---|---|---|
| | conditions | coefficient of friction | stick slip | coefficient of friction | stick slip |
| Example 49 | 25° C., 60% RH | 0.26 | ○ | 0.27 | ○ |
| | 40° C., 80% RH | 0.28 | ○ | 0.31 | ○ |
| Example 50 | 25° C., 60% RH | 0.28 | ○ | 0.28 | ○ |
| | 40° C., 80% RH | 0.29 | ○ | 0.31 | ○ |
| Example 51 | 25° C., 60% RH | 0.31 | ○ | 0.33 | ○ |
| | 40° C., 80% RH | 0.38 | ○ | 0.39 | ○ |
| Example 52 | 25° C., 60% RH | 0.29 | ○ | 0.30 | ○ |
| | 40° C., 80% RH | 0.31 | ○ | 0.32 | ○ |

TABLE 12-continued

| | conditions | pre-aging coefficient of friction | stick slip | post-aging coefficient of friction | stick slip |
| --- | --- | --- | --- | --- | --- |
| Example 53 | 25° C., 60% RH | 0.26 | ○ | 0.27 | ○ |
| | 40° C., 80% RH | 0.28 | ○ | 0.29 | ○ |
| Example 54 | 25° C., 60% RH | 0.29 | ○ | 0.31 | ○ |
| | 40° C., 80% RH | 0.33 | ○ | 0.36 | ○ |
| Example 55 | 25° C., 60% RH | 0.25 | ○ | 0.26 | ○ |
| | 40° C., 80% RH | 0.27 | ○ | 0.28 | ○ |
| Example 56 | 25° C., 60% RH | 0.26 | ○ | 0.29 | ○ |
| | 40° C., 80% RH | 0.29 | ○ | 0.30 | ○ |

TABLE 13

| | conditions | pre-aging coefficient of friction | stick slip | post-aging coefficient of friction | stick slip |
| --- | --- | --- | --- | --- | --- |
| Example 57 | 25° C., 60% RH | 0.27 | ○ | 0.28 | ○ |
| | 40° C., 80% RH | 0.29 | ○ | 0.31 | ○ |
| Example 58 | 25° C., 60% RH | 0.29 | ○ | 0.30 | ○ |
| | 40° C., 80% RH | 0.31 | ○ | 0.32 | ○ |
| Example 59 | 25° C., 60% RH | 0.26 | ○ | 0.27 | ○ |
| | 40° C., 80% RH | 0.29 | ○ | 0.30 | ○ |
| Example 60 | 25° C., 60% RH | 0.25 | ○ | 0.25 | ○ |
| | 40° C., 80% RH | 0.27 | ○ | 0.28 | ○ |
| Example 61 | 25° C., 60% RH | 0.24 | ○ | 0.25 | ○ |
| | 40° C., 80% RH | 0.25 | ○ | 0.25 | ○ |
| Example 62 | 25° C., 60% RH | 0.28 | ○ | 0.29 | ○ |
| | 40° C., 80% RH | 0.30 | ○ | 0.32 | ○ |
| Comparative Example 3 | 25° C., 60% RH | — | X | — | X |
| | 40° C., 80% RH | — | X | — | X |
| Comparative Example 4 | 25° C., 60% RH | 0.35 | X | 0.41 | X |
| | 40° C., 80% RH | 0.42 | X | 0.47 | X |

It is seen from Tables 12 and 13 that, by using the amine salt of perfluoroalkyl carboxylic acid as the lubricant, very good results could be obtained with the coefficients of friction or stick slip not undergoing deterioration under various conditions.

Examples for a metal thin film type magnetic recording medium, that is a hard disk provided with an underlayer, are given hereinbelow.

EXAMPLE 63

An Al-Mg alloy substrate (thickness, 15 mm; outside diameter, 95 mm; inside diameter, 25 mm) on which an Ni-P plating layer was formed to a thickness of 15 μm as a non-magnetic metal under layer was produced. On this plating layer was formed a low melting metal under layer, having a film thickness of 200 Å, by depositing bismuth (Bi) by electron beam evaporation under the pressure of $1 \times 10^{-5}$ Torr and the substrate temperature of 150° C.

On this under layer was formed a metal magnetic thin film (film thickness, 1000 Å) by depositing cobalt (Co) by electron beam evaporation under the pressure of $1 \times 10^{-5}$ Torr and the substrate temperature of 150° C.

EXAMPLES 64 TO 76

Sample disks were produced in the same way as in Example 63 except that the products 18 to 30 were used in place of the product 17 used as the lubricant in Example 63.

COMPARATIVE EXAMPLE 5

Using the same technique as in Example 63, a low melting underlayer and a metal magnetic layer were formed on an Al-Mg alloy substrate on which a Ni-P plating layer was previously formed. A carbon protective film was applied thereto, and an ammonium salt of nonadecafluoro carboxylic acid was then coated as the lubricant on the protective film to produce a sample disk.

For each of the sample disks, coefficients of friction after 20,000 times of the contact start stop (CSS) test were checked. The results are shown in Table 14.

TABLE 14

| Example | lubricant | coefficient friction |
| --- | --- | --- |
| Example 63 | product 17 | 0.36 |
| Example 64 | product 18 | 0.38 |
| Example 65 | product 19 | 0.42 |
| Example 66 | product 20 | 0.43 |
| Example 67 | product 21 | 0.42 |
| Example 68 | product 22 | 0.35 |
| Example 69 | product 23 | 0.45 |
| Example 70 | product 24 | 0.41 |
| Example 71 | product 25 | 0.42 |
| Example 72 | product 26 | 0.45 |
| Example 73 | product 27 | 0.41 |
| Example 74 | product 28 | 0.39 |
| Example 75 | product 29 | 0.44 |
| Example 76 | product 30 | 0.38 |
| Comparative Example 5 | — | > 0.5 |

It is seen from the above Table 14 that the sample disk in which a carbon protective film is formed on the surface of the metal magnetic thin film and the product shown in Table 1 as the lubricant is applied thereto exhibits superior CSS characteristics and improved durability. In Comparative Example 5, the coefficient of friction was more than 0.5 for 5000 times of CSS.

Examples for metal thin film type magnetic recording medium (metal evapolated tape) follow.

EXAMPLE 77

A magnetic metal thin film having a film thickness of 1,000 Å was produced by applying cobalt (Co) on a polyethylene terephthalate film 14 μm thick by oblique evaporation.

On the surface of this magnetic metal thin film was applied the product 17 of Table 10 dissolved in a solvent mixture of fleon and ethanol at a coating rate of 5 mg/m² and the thus produced film was cut to 8 mm width to produce sample tapes.

EXAMPLE 78 TO 90

Sample tapes were produced in the same way as in Example 77 except using the products 18 to 30 in lieu of the product 17 of Table 10 used as the lubricant in Example 77.

COMPARATIVE EXAMPLE 6

Sample tapes were produced in the same way as in Example 77 except that nothing was coated in lieu of the product 17 of Table used as the lubricant in Example 77.

COMPARATIVE EXAMPLE 7

Sample tapes were produced in the same way as in Example 77 except substituting an ammonium salt of nonadecafluoro carboxylic acid for the product 17 of Table 10 used as the lubricant in Example 77.

The coefficients of friction, still durability and shuttle durability of the above sample tapes were measured at the temperature of 25° C. and relative humidity of 60%, at the temperature of −5° C. and at the temperature of 40° C. and relative humidity of 30%. Still durability was measured by the time elapsed until the output is decreased to −3 dB in the paused state. Shuttle durability was measured by the number of times of shuttling until the output was lowered by 3 dB on the occasion of shuttle running continuing for 2 minutes each time. The results are shown in Tables 15, 16, 17 and 18.

TABLE 15

| | conditions | co-efficient of friction | still durability (minutes) | shuttle durability (number of times) |
|---|---|---|---|---|
| Example 77 | 25° C., 60% RH | 0.30 | >60 | >150 |
| | −5° C. | 0.32 | 48 | >150 |
| | 40° C., 30% RH | 0.35 | 32 | >150 |
| Example 78 | 25° C., 60% RH | 0.28 | >60 | >150 |
| | −5° C. | 0.27 | 45 | >150 |
| | 40° C., 30% RH | 0.28 | 40 | >150 |

TABLE 16

| | conditions | co-efficient of friction | still durability (minutes) | shuttle durability (number of times) |
|---|---|---|---|---|
| Example 79 | 25° C., 60% RH | 0.26 | >60 | >150 |
| | −5° C. | 0.29 | 48 | >150 |
| | 40° C., 30% RH | 0.30 | 40 | >150 |
| Example 80 | 25° C., 60% RH | 0.29 | >60 | >150 |
| | −5° C. | 0.32 | 50 | >150 |
| | 40° C., 30% RH | 0.28 | 42 | >150 |
| Example 81 | 25° C., 60% RH | 0.30 | >60 | >150 |
| | −5° C. | 0.31 | 39 | >150 |
| | 40° C., 30% RH | 0.32 | 29 | >150 |
| Example 82 | 25° C., 60% RH | 0.26 | >60 | >150 |
| | −5° C. | 0.28 | 35 | >150 |
| | 40° C., 30% RH | 0.27 | 32 | >150 |
| Example 83 | 25° C., 60% RH | 0.25 | >60 | >150 |
| | −5° C. | 0.26 | 38 | >150 |
| | 40° C., 30% RH | 0.26 | 36 | >150 |

TABLE 17

| | conditions | co-efficient of friction | still durability (minutes) | shuttle durability (number of times) |
|---|---|---|---|---|
| Example 84 | 25° C., 60% RH | 0.28 | >60 | >150 |
| | −5° C. | 0.27 | 49 | >150 |
| | 40° C., 30% RH | 0.30 | 40 | >150 |
| Example 85 | 25° C., 60% RH | 0.24 | 55 | >150 |
| | −5° C. | 0.26 | 45 | >150 |
| | 40° C., 30% RH | 0.25 | 39 | >150 |
| Example 86 | 25° C., 60% RH | 0.25 | 60 | >150 |
| | −5° C. | 0.27 | 49 | >150 |
| | 40° C., 30% RH | 0.27 | 35 | >150 |
| Example 87 | 25° C., 60% RH | 0.26 | 30 | >150 |
| | −5° C. | 0.27 | 25 | >150 |
| | 40° C., 30% RH | 0.29 | 15 | >150 |
| Example 88 | 25° C., 60% RH | 0.25 | 35 | >150 |
| | −5° C. | 0.26 | 32 | >150 |
| | 40° C., 30% RH | 0.25 | 30 | >150 |

TABLE 18

| | conditions | co-efficient of friction | still durability (minutes) | shuttle durability (number of times) |
|---|---|---|---|---|
| Example 89 | 25° C., 60% RH | 0.28 | 50 | >150 |
| | −5° C. | 0.29 | 48 | >150 |
| | 40° C., 30% RH | 0.29 | 47 | >150 |
| Example 90 | 25° C., 60% RH | 0.25 | 30 | >150 |
| | −5° C. | 0.24 | 27 | >150 |
| | 40° C., 30% RH | 0.25 | 19 | >150 |

TABLE 18-continued

| | conditions | co-efficient of friction | still durability (minutes) | shuttle durability (number of times) |
|---|---|---|---|---|
| Comparative Example 6 | 25° C., 60% RH | 0.9 | 2 | 3 |
| | −5° C. | — | — | — |
| | 40° C., 30% RH | — | — | — |
| Comparative Example 7 | 25° C., 60% RH | 0.35 | 20 | 95 |
| | −5° C. | 0.38 | 8 | 100 |
| | 40° C., 30% RH | 0.49 | 12 | 90 |

It is seen from Table 15, 16, 17 and 18 that, by using the amine salt of perfluoroalkyl carboxylic acid as the lubricant, very good results could be obtained without deterioration in the coefficients of friction, still durability and shuttle durability under various conditions.

A synthesis example of a fluoroamine salt of perfluoroalkyl carboxylic acid is given below.

SYNTHESIS EXAMPLE 3

Commercially available nonadecafluorodecanoic acid and pentadecafluorooctylamine were mixed together and stirred at 100° C. for 20 minutes. After cooling, the reaction product was recrystallized in a solvent mixture of fleon and petroleum ether. A pentadecafluorooctylaminesalt of nonadecafluorodecanoic acid melting at 142° to 143° C. was produced.

Figure 7:
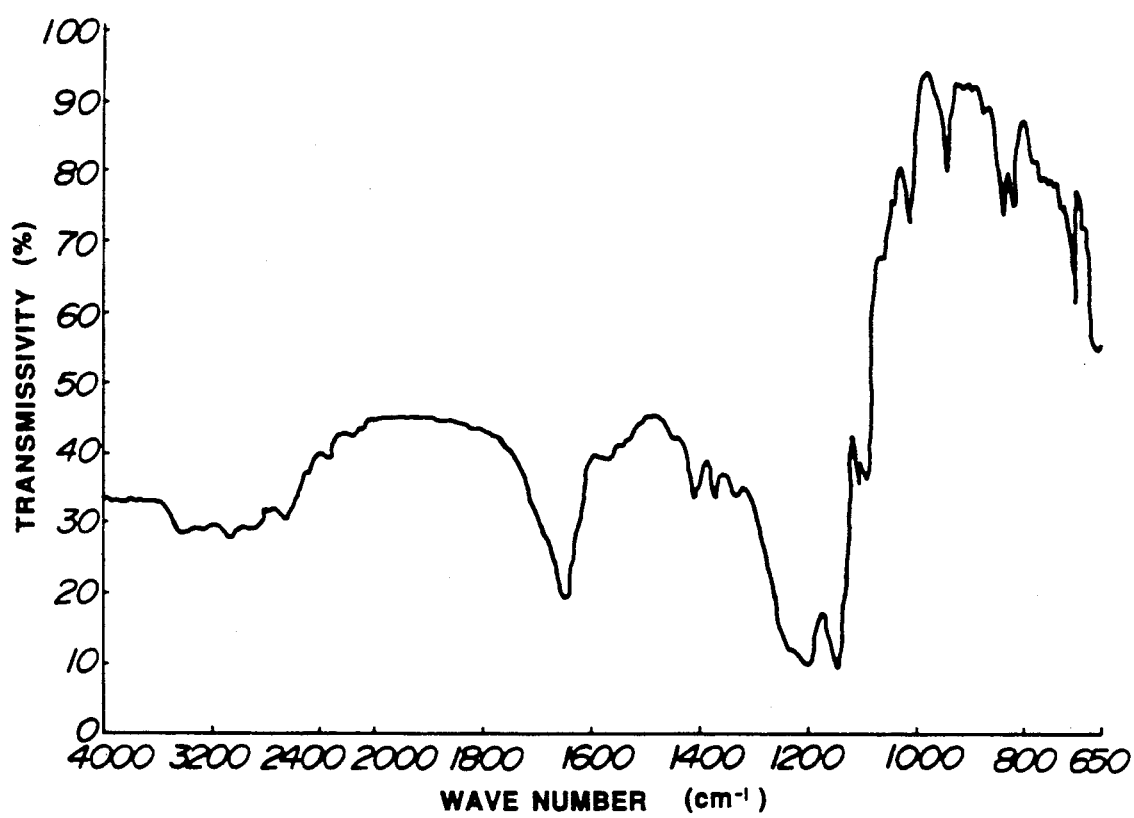
FIG. 7 shows an IR absorption spectrum of a typical perfluoroamine salt of perfluoroalkyl carboxylic acid.

The IR absorption spectrum of this compound is shown in FIG. 7.

In the IR spectrum shown in FIG. 7, broad absorption ascribable to the stretching vibration of an ammonium (salt) may be observed at 3200 to 2800 cm$^{-1}$, from which it is seen that the pentadecafluorooctylamine of the starting material has been turned into a salt. The structure of this amine salt is supported by the fact that stretching vibration due to co is observed at 1640 cm$^{-1}$ and and that the stretching vibration due to CF is observed at 1300 to 1100 cm$^{-1}$.

The reaction product produced by the above synthesis was a pentadecafluorooctylamine salt of n-nonadecafluoro decanoic acid having the structure of $C_9F_{19}COO^{\ominus}\cdot H_3N^{\oplus}CH_2C_7F_{15}$.

The elementary analysis was carried out of the pentadecafluorooctylamine salt of n-nonadecafluorodecanoic acid was as follows:

Found: C 23.91% ; F 70.50%.

Calcd. for $C_{18}H_5F_{34}NO_2$:C 23.68%; F 70.73%

The structural formula of this amine salt is also supported from the above result.

In accordance with the above synthesis example, fluoroamine salts of perfluoroalkylcarboxylic acid shown in Table 19 were produced using various different perfluoroalkyl carboxylic acids and fluoroamines.

TABLE 19

| | Structures |
|---|---|
| product 31 | $C_9F_{19}COO^{\ominus}\cdot H_3N^{\oplus}CH_2C_7F_{15}$ |
| product 32 | $C_7F_{15}COO^{\ominus}\cdot H_3N^{\oplus}CH_2C_7F_{15}$ |
| product 33 | $C_7F_{15}COO^{\ominus}\cdot H_3N^{\oplus}CH_2C_9F_{19}$ |
| product 34 | $C_7F_{15}COO^{\ominus}\cdot H_2N^{\oplus}CH_2C_7F_{15}$<br>$\mid$<br>$C_2H_5$ |

TABLE 19-continued

| | Structures |
|---|---|
| product 35 | $C_7F_{15}COO^{\ominus}.H_2\overset{\oplus}{N}CH_2C_7F_{15}$<br>$\quad\quad\quad\quad\quad\quad\;\;\mid$<br>$\quad\quad\quad\quad\quad\quad\;C_4H_9$ |
| product 36 | $C_7F_{15}COO^{\ominus}.H_2\overset{\oplus}{N}\!\!\diagup\!\!\overset{\textstyle CH_3}{\underset{\textstyle CH_3}{\diagdown CH_2C_7F_{15}}}$ |

Using the products shown in Table 19, the following magnetic recording medium was produced.

The following Examples are those for the coated type magnetic recording medium.

EXAMPLE 91

With the following composition

| Co-coated γ-Fe₂O₃ | 100 pts. by wt. |
|---|---|
| vinyl chloride-vinyl acetate copolymer (VAGH produced by U. C. C.) | 10.5 pts. by wt. |
| polyurethane resin (M-5033 produced by Nippon Polyurethane Co. Ltd.) | 10.5 pts. by wt. |
| carbon (antistatics) | 5 pts. by wt. |
| lecithin (dispersant) | 1 pt. by wt. |
| methylethylketone | 150 pts. by wt. |
| methylisobutylketone | 150 pts. by wt. |

| Co-coated γ-Fe₂O₃ | 100 pts. by wt. |
|---|---|
| vinyl chloride-vinyl acetate copolymer (VAGH produced by U.C.C.) | 10.5 pts. by wt. |
| polyurethane resin (M-5033 produced by Nippon Polyurethane Co. Ltd.) | 10.5 pts. by wt. |
| carbon (antistatics) | 5 pts. by wt. |
| lecithin (dispersant) | 1 pt. by wt. |
| methylethylketone | 150 pts. by wt. |
| methylisobutylketone | 150 pts. by wt. | as the basic composition, 1, 5 parts by weight of a synthesis product 31 in Table 19 were added to this basic composition to produce a mixture which was then mixed in a ball mill for 24 hours, taken out through a filter and admixed with 4 parts by weight of a curing agent. The resulting mixture was stirred for 30 minutes to a magnetic paint which was then coated on a 12 μm thick polyethylene terephthalate base to a dry thickness of 5 μm. The resulting product was dried after magnetic field orientation, wound, calendered and cut to half an inch width to produce sample tapes.

EXAMPLES 92 TO 96

Sample tapes were produced in the same way as in Example 91 except that synthesis products 32 to 36 were used in lieu of synthesis product 31.

COMPARATIVE EXAMPLE 8

Sample tapes were produced in the same way as in Example 91 except that nothing was used as the lubricant in lieu of synthesis product 31.

The coefficients of friction and the stick slip of the sample tapes produced as above were measured both before and after aging under the conditions of the temperature of 25° C. and the relative humidity of 60% and under the conditions of the temperature of 40° C. and the relative humidity of 80%. The results are shown in Table 20.

TABLE 20

| | | pre-aging | | post-aging | |
|---|---|---|---|---|---|
| | conditions | coefficient of friction | stick slip | coefficient of friction | stick slip |
| Example 91 | 25° C., 60% RH | 0.24 | ○ | 0.25 | ○ |
| | 40° C., 80% RH | 0.25 | ○ | 0.25 | ○ |
| Example 92 | 25° C., 60% RH | 0.25 | ○ | 0.27 | ○ |
| | 40° C., 80% RH | 0.26 | ○ | 0.27 | ○ |
| Example 93 | 25° C., 60% RH | 0.25 | ○ | 0.28 | ○ |
| | 40° C., 80% RH | 0.25 | ○ | 0.26 | ○ |
| Example 94 | 25° C., 60% RH | 0.27 | ○ | 0.29 | ○ |
| | 40° C., 80% RH | 0.26 | ○ | 0.28 | ○ |
| Example 95 | 25° C., 60% RH | 0.27 | ○ | 0.29 | ○ |
| | 40° C., 80% RH | 0.28 | ○ | 0.31 | ○ |
| Example 96 | 25° C., 60% RH | 0.26 | ○ | 0.28 | ○ |
| | 40° C., 80% RH | 0.27 | ○ | 0.30 | ○ |
| Comparative Example 8 | 25° C., 60% RH | — | X | — | X |
| | 40° C., 80% RH | — | X | — | X |

It is seen from Table 20 that, by using the fluoroamine salt of perfluoroalkyl carboxylic acid as the lubricant, very good results could be obtained with the coefficients of friction or stick slip not undergoing deterioration under various conditions.

Examples follow for a metal thin film type magnetic recording medium, that is a hard disk provided with an underlayer.

EXAMPLE 97

An Al-Mg alloy substrate (thickness, 15 mm; outside diameter, 95 mm; inside diameter, 25 mm) on which an Ni-P plating layer was formed to a thickness of 15 μm as a non-magnetic metal under layer was produced. On this plating layer was formed a low melting metal under layer, having a film thickness of 200 Å, by depositing bismuth (Bi) by electron beam evaporation under the pressure of $1\times10^{-5}$ Torr and the substrate temperature of 150° C.

On this under layer was formed a metal magnetic thin film (film thickness, 1000 Å) by depositing cobalt (Co) by electron beam evaporation under the pressure of $1\times10^{-5}$ Torr and the substrate temperature of 150° C. On the thus produced metal magnetic thin film was formed a carbon protective film by vacuum evaporation.

Finally, the lubricant shown as the product 31 in Table 19 was apllied on the surface of this carbon protective film to produce a sample disk.

EXAMPLE 98 TO 102

Sample disks were produced in the same way as in Example 97 except that the products 32 to 36 were substituted for the product 31 used as the lubricant in Example 97.

The coefficients of friction after 20000 times of contact start and stop (CSS) test were checked of the above sample disks. The results are shown in Table 21.

TABLE 21

| Example | lubricant | coefficient of friction |
|---|---|---|
| Example 97 | product 31 | 0.37 |
| Example 98 | product 32 | 0.35 |
| Example 99 | product 33 | 0.30 |

TABLE 21-continued

| Example | lubricant | coefficient of friction |
| --- | --- | --- |
| Example 100 | product 34 | 0.29 |
| Example 101 | product 35 | 0.39 |
| Example 102 | product 36 | 0.40 |

It is seen from the above Table 21, that the sample disk in which a carbon protective film is formed on the surface of the metal magnetic thin film and the product shown in Table 19 as the lubricant is applied thereto exhibits superior CSS characteristics and improved durability.

Examples for metal thin film type magnetic recording medium (metal evaporated tape) follow.

EXAMPLE 103

A magnetic metal thin film having a film thickness of 1,000 Å was produced by applying cobalt (Co) on a polyethylene terephthalate film 14 μm thick by oblique evaporation.

On the surface of this magnetic metal thin film was applied the product 31 of Table 19 dissolved in a solvent mixture of fleon and ethanol at a coating rate of 5 mg/m² and the thus produced film was cut to 8 mm width to produce sample tapes.

EXAMPLES 104 TO 108

Sample tapes were produced in the same way as in Example 103 except using the products 32 to 36 in lieu of the product 31 of Table 19 used as the lubricant in Example 103.

The coefficients of friction, still durability and shuttle durability of the above sample tapes were measured at the temperature of 25° C. and relative humidity of 60%, at the temperature of −5° C. and at the temperature of 40° C. and relative humidity of 30%. Still durability was measured by the time elapsed until the output is decreased to −3 dB in the paused state. Shuttle durability was measured by the number of times of shuttling until the output was lowered by 3 dB on the occasion of shuttle running continuing for 2 minutes each time. Similar measurements were made as Comparative Example 9 of a blank tape produced without using the lubricant. The results are shown in Tables 22.

TABLE 22

| Example | conditions | coefficient of friction | still durability (minutes) | shuttle durability (number of times) |
| --- | --- | --- | --- | --- |
| Example 103 | 25° C., 60% RH | 0.26 | >120 | >150 |
| | −5° C. | 0.27 | 98 | >150 |
| | 40° C., 30% RH | 0.29 | 85 | >150 |
| Example 104 | 25° C., 60% RH | 0.25 | >120 | >150 |
| | −5° C. | 0.27 | 100 | >150 |
| | 40° C., 30% RH | 0.29 | 92 | >150 |
| Example 105 | 25° C., 60% RH | 0.24 | >120 | >150 |
| | −5° C. | 0.25 | >120 | >150 |
| | 40° C., 30% RH | 0.25 | 89 | >150 |
| Example 106 | 25° C., 60% RH | 0.25 | >120 | >150 |
| | −5° C. | 0.28 | 95 | >150 |
| | 40° C., 30% RH | 0.28 | >120 | >150 |
| Example 107 | 25° C., 60% RH | 0.27 | >120 | >150 |
| | −5° C. | 0.26 | 100 | >150 |
| | 40° C., 30% RH | 0.30 | 87 | >150 |
| Example 108 | 25° C., 60% RH | 0.24 | >120 | >150 |
| | −5° C. | 0.24 | 95 | >150 |
| | 40° C., 30% RH | 0.25 | 78 | >150 |
| Comparative Example 9 | 25° C., 60% RH | 0.9 | 2 | 3 |
| | −5° C. | — | — | — |
| | 40° C., 30% RH | — | — | — |

It is seen from Tables 22 that, by using the fluoroamine salt of perfluoro carboxylic acid as the lubricant, very good results could be obtained without deterioration in the coefficients of friction, still durability and shuttle durability under various conditions.

We claim as our invention:

1. A magnetic recording medium comprising:
   a non-magnetic base,
   a ferromagnetic thin film on said non-magnetic base and
   a lubricant layer on said ferromagnetic thin film,
   wherein said lubricant layer comprises an amine salt of carboxylic acid represented by the formula:

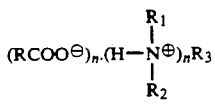

or by the formula:

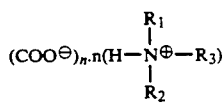

wherein n stands for an integer of 1-3, R, $R_3$ stand for a hydrocarbon group and $R_1$, $R_2$ stand for hydrogen or a hydrocarbon group.

2. A magnetic recording medium according to claim 1, wherein at least one of R, $R_1$, $R_2$ or $R_3$ stands for a hydrocarbon group having 10 or more carbon atoms.

3. A magnetic recording medium according to claim 1, wherein a rust-proofing layer is formed between said ferromagnetic thin film and said lubricant layer.

4. A magnetic recording medium according to claim 1, wherein a back coating layer is formed on a back surface of said non-magnetic base, said back coating layer comprises an amine salt of carboxylic acid represented by the formula:

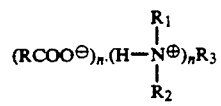

or by the formula:

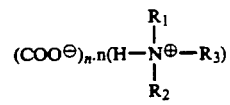

wherein n stands for an integer of 1-3, R, $R_3$ stand for a hydrocarbon group and $R_1$, $R_2$ stand for hydrocarbon or a hydrocarbon group.

5. A magnetic recording medium including at least a magnetic layer on a non-magnetic base, wherein it comprises an amine salt of perfluoralkyl carboxylic acid represented by a formula chosen from the group consisting of:

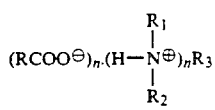

and

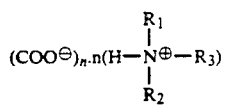

wherein n stands for an integer of 1 to 3, R stands for a perfluoralkyl group, $R_3$ stands for a hydrocarbon group and $R_1$, $R_2$ are chosen from the group consisting of hydrogen and hydrocarbon group, at least one of $R_1$, $R_2$, $R_3$ is a hydrocarbon group having 10 or more carbon atoms.

6. A magnetic recording medium according to claim 5 wherein the number of carbon atoms in the perfluoroalkyl group R is 3 to 12.

7. A magnetic recording medium according to claim 5 wherein the amine salt of perfluoroalkyl carboxylic acid is contained in the magnetic layer.

8. A magnetic recording medium according to claim 5 wherein the amine salt of perfluoroalkyl carboxylic acid is top coated on the magnetic layer.

9. A magnetic recording medium according to claim 5 wherein a rust-proofing layer is formed on the magnetic layer and the amine salt of perfluoroalkyl carboxylic acid is top coated on said rust-proofing layer.

10. A magnetic recording medium according to claims 5 wherein the amine salt of perfluoroalkyl carboxylic acid is top coated on a back coating layer or contained in a back coating layer or both.

11. A magnetic recording medium including at least a magnetic layer on a non-magnetic base, wherein it comprises an fluoro amine salt of perfluoroalkyl carboxylic acid represented by a formula chosen from the group consisting of:

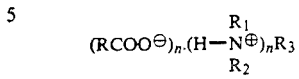

and

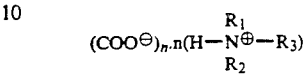

wherein n stands for an integer of 1 to 3, R stands for a perfluoroalkyl group, $R_3$ stands for a hydrocarbon group of a fluorine substituted hydrocarbon group and $R_1$ and $R_2$ are chosen from the group consisting of hydrogen, a hydrocarbon group and fluorine-substituted hydrocarbon group, at least one of $R_1$, $R_2$ or $R_3$ being a fluorine substituted hydrocarbon group.

12. A magnetic recording medium according to claim 11 wherein the number of carbon atoms of the perfluoroalkyl group R is 3 to 12.

13. A magnetic recording medium according to claim 11 wherein the fluoro amine salt of perfluoroalkyl carboxylic acid is contained in the magnetic layer.

14. A magnetic recording medium according to claim 11 wherein the fluoro amine salt of perfluoroalky carboxylic acid is top coated on the magnetic layer.

15. A magnetic recording medium according to claim 11 wherein a rust-proofing layer is formed onthe magnetic layer and the fluoro amine salt of perfluoroalkyl carboxylic acid is top coated on said rust-proofing layer.

16. A magnetic recording medium according to claims 11 wherein the fluoro amine salt of perfluoro carboxylic acid is top coated or contained in a back coating layer.

* * * * *